May 29, 1928.

G. M. EATON 1,671,468

BALANCING APPARATUS

Filed Aug. 6, 1923

WITNESSES:

INVENTOR
George M. Eaton
BY
ATTORNEY

Patented May 29, 1928.

1,671,468

UNITED STATES PATENT OFFICE.

GEORGE M. EATON, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCING APPARATUS.

Application filed August 6, 1923. Serial No. 655,914.

My invention relates to balancing apparatus and particularly to means for balancing rotors, such as the armatures of dynamo-electric machines and more especially to a design of motor housing which will permit of balancing the rotor while journaled therein.

It is among the objects of my invention to provide a simple design of motor housing which is provided with facilities for mounting the same on a device which comprises a plurality of pedestal blocks on which the motor housing is supported with a plurality of spring members interposed at one end and having pivotal supports at its other end, such as is disclosed in the copending application of Carl Richard Soderberg, Serial No. 651,231 filed July 13, 1923, and assigned to the Westinghouse Electric and Manufacturing Company.

The motor frame is provided with extension lugs which have the two-fold function of providing supports for seating the frame on the pedestals and of providing mounting lugs by which they are secured in position in service. This invention is especially applicable to motors utilized in railway service which are spring borne at one end and axle hung on their other ends, the usual provision being made for axle bearings on which the frame is supported.

Figure 1:
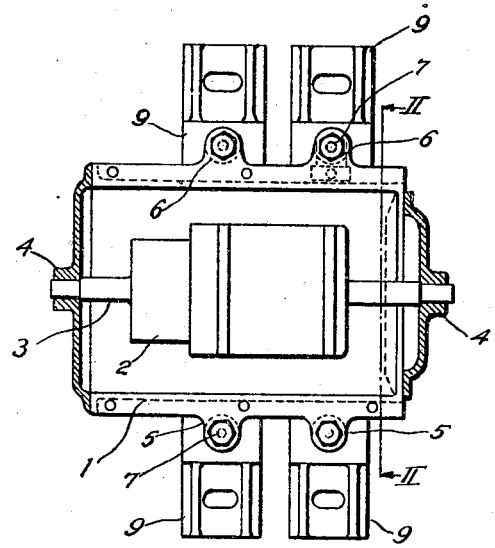
Figure 2:
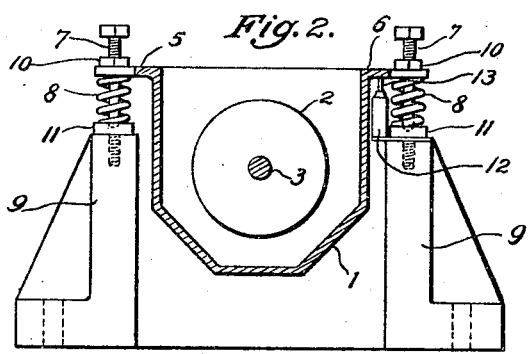
Figure 3:

In the accompanying drawings constituting a part hereof and in which like reference characters designate like parts, Fig. 1 is a view, partially in plan and partially in section, of a motor mounted on suitable blocks in accordance with the principles of my invention, and Fig. 2 is a view, partially in end elevation and partially in section, showing the motor frame supported by a plurality of coil springs and having a dial indicator associated therewith, and Fig. 3 is a fragmentary end view showing position of the indicator.

Referring to Fig. 1, the structure therein illustrated comprises the motor housing 1 having an armature 2 journalled by its shaft 3 in the end brackets 4 thereof. The motor frame is provided with a plurality of extension lugs 5 on one side and similar lugs 6 in alinement therewith on its opposite side. The lugs 5 and 6 may be utilized for securing journal bearings by which the motor is mounted on a vehicle or for any other type of mounting. The lugs 5 and 6 are provided with screw-threaded openings adapted to receive bolts 7 which have helical coil springs 8 disposed therearound to provide a resilient support, for the purpose of testing the dynamic balance of the armature 2.

The motor frame 1 is mounted on a plurality of pedestal blocks 9 which are secured to a bed plate or the like in spaced relation to be in alinement and register with the lugs 5 and 6 of the motor frame. The adjustable screw bolts 7 are provided with lock nuts 10 and are adapted to extend through the openings provided in the lugs 5 and 6. The coil springs 8 are seated on bolts 11 screwed into the tops of the pedestals 9. The bolts 11 are provided with spherical seating surfaces which engage the correspondingly shaped ends of the bolts 7.

The object of this arrangement of bolts is to permit of vertical adjustment to alternately support one side of the motor on the springs 8 and the other side on the ends of the screw bolts 7 thereby providing a spring mounting on one end and a pivotal support on the other end to give the motor 1 a single degree of freedom. A dial indicator 12 is secured to the pedestal 9 on the side of the motor which is supported on the springs 8 and a contact rod 13 of the indicator is brought into engagement with the motor frame to indicate oscillatory movement thereof.

The armature 2 is actuated in the usual way by energizing the field winding of the motor to cause it to rotate and any unbalance in the rotating mass will be indicated by the oscillation of the frame at its spring-supported end which is a result of the moment of inertia or the product of the unbalanced mass by its distance from the pivot at the opposite screw bolts 7.

If the springs 8 are calibrated to produce a predetermined deflection for a given load, the reading of the dial indicator 12 will indicate the relative amount of unbalance and the correction for this unbalance may be made by the addition of weights to the armature in two opposite transverse planes. When a reading is obtained and necessary correction weights are applied, the frame is raised at the spring-supported end to rest upon the ends of the screws 7 and the screw bolts on the opposite ends are adjusted to lower the opposite side of the motor frame on its respective springs 8. The dial indicator 12 is removed to the opposite side of the motor and the operation is repeated. The necessary correction is made by adding weights in the transverse plane on the opposite end, which may be readily done by a cut-and-try method.

An adjustable counter-balancing device may be utilized in conjunction with this scheme and other means of marking and indicating the location and amount of unbalance, such as are well known in the art, may be utilized in conducting this method of balancing rotors.

It will be obvious to those skilled in the art that various modifications may be made in carrying out the application of my invention without departing from the principles herein set forth.

I claim as my invention:—

1. A device for balancing dynamo-electric machines having threaded supporting lugs comprising supporting members provided with spherical seats, springs interposed between said lugs, and the supporting members, and bolts having correspondingly shaped ends for engaging the spherical seats and threads for engaging the threaded supporting lugs.

2. The combination with a dynamo-electric machine comprising a housing and a rotor within the housing, said housing being provided with supporting members in transverse planes that pass through positions on the rotor adapted for attaching balancing weights of a base member, spring elements disposed between the supporting members and the base member and pivot elements adapted to be interposed between the supporting members and the base member.

3. The combination with a dynamo-electric machine provided with supporting members by which the machine is mounted, said members being also adaptable as pivot seats for balancing said machine of pivot members for engaging some of said supporting members and spring members for resiliently supporting other of said supporting members.

4. The combination with a dynamo-electric machine provided with supporting members by which the machine is mounted, said members being also adaptable as spring and pivot seats for balancing said machine of spring and pivot members for engaging the supporting members.

5. A device for testing the unbalance of a rotor assembled in a permanent housing which comprises supporting members on the housing in planes adapted for attaching correction weights to the rotor for pivot and spring locating seats and spring and pivot members for mounting said housing by said supporting members in such a manner as to permit vertical oscillatory motion thereof.

6. A device for testing the unbalance of a rotor assembled in a permanent housing which comprises supporting members on the housing in planes containing positions for attaching correction weights to the rotor for pivot and spring locating seats and spring and pivot members for mounting said housing by said supporting members in such a manner as to permit oscillatory motion thereof with reference to an arbitrary axis.

7. The combination with a dynamo-electric machine having supporting lugs disposed in two transverse planes thereof, of a base member, resilient elements interposed between said lugs and the base member and pivot members attached to the supporting lugs, said pivot members being adjustable to lift the machine from the resilient elements.

8. The combination with a dynamo-electric machine provided with supporting members disposed in transverse planes thereof, of pivot members for engaging the supporting members in one transverse plane and spring members for supporting the machine in another transverse plane, said pivot and spring members being interchangeable.

9. The combination with a dynamo-electric machine provided with supporting members disposed in transverse planes thereof, of combination pivot and spring members for supporting the machine in two transverse planes, said pivot and spring members being adjustable to function either as pivots or as resilient supporting means.

10. The combination with a dynamo-electric machine provided with supporting members disposed in transverse planes thereof, of pivot means for engaging the supporting members in one transverse plane and spring members for engaging other supporting members.

In testimony whereof, I have hereunto subscribed my name this first day of August, 1923.

GEORGE M. EATON.